Nov. 13, 1951  A. J. BATZLER  2,575,040
POURING SPOUT FOR LIQUID CONTAINERS WITH OPENING AND CLOSURE,
SAID SPOUT ADAPTED TO BE SEALED AROUND THE CLOSED OPENING
Filed Jan. 27, 1949
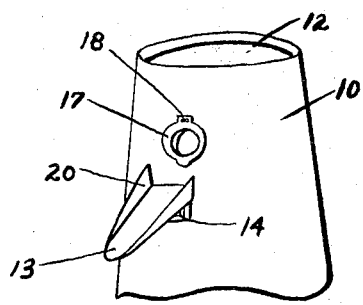
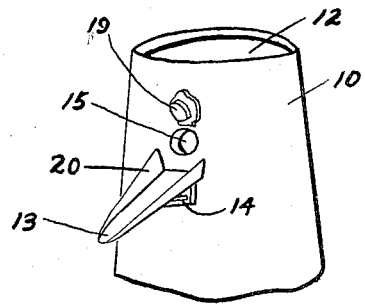
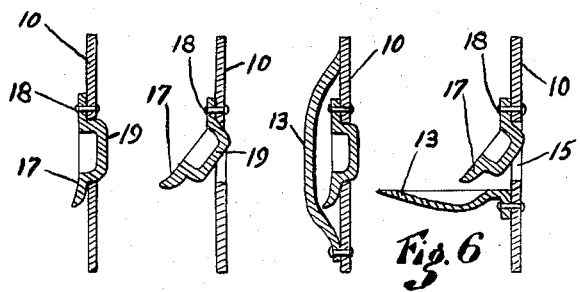
INVENTOR.
ANTHONY J. BATZLER
BY Christian R. Nielsen
ATTORNEY.

Patented Nov. 13, 1951

2,575,040

UNITED STATES PATENT OFFICE 2,575,040

POURING SPOUT FOR LIQUID CONTAINERS WITH OPENING AND CLOSURE, SAID SPOUT ADAPTED TO BE SEALED AROUND THE CLOSED OPENING

Anthony J. Batzler, Milwaukee, Wis.

Application January 27, 1949, Serial No. 73,020

2 Claims. (Cl. 222—529)

My invention relates to pouring spouts and more particularly to a spout that may be attached and made a part of the outer wall of a receptacle or container used for liquids.

The object of my invention is to provide a spout arrangement that may be attached to the outer surface of a waterproof paper container or the like to permit all or a portion of the contents of the container to be removed without the use of the filler cap.

Another object of my invention is to provide a spout arrangement that is adherently incorporated into the construction of the container permitting it to be sealed and forming an integral part of the wall of the container with provisions to enable the user to extend the spout member in a pouring position and open the port without any mechanical changes and without the use of tools.

Obviously, it is desirable in the conveying of milk or the like to have the contents of the receptacle sealed in a manner that will not permit access or contact with the outside of the receptacle when dispensing the contents for use.

The conventional type of milk bottle whether it be made of glass or paraffined paper affords no protection for the milk from the edge of the bottle even though the milk is sealed in the container during the process of transportation. It is still necessary to remove the filler cap and pour the contents over the upper edge of the bottle and this edge being recessed is frequently subject to an accumulation of unsanitary foreign matter. This objection is overcome entirely by the device herein specified.

Another advantage of my device is the fact that the port or aperture may be positioned in the proper place at a height equal to the bottom of the cream line and will thus enable the user to pour the cream from the bottle without disturbing the milk.

Other and further objects of my invention will become more apparent as the description proceeds when taken in conjunction with the drawings in which:

Figure 1 shows a modified form of spout arrangement having a recessed bung wedged into the port.

Figure 2 shows the device illustrated in Figure 3 with the bung raised upward to bring the port in an open position.

Figure 3 is a cross-sectional view of a section of the receptacle wall showing the bung in a closed position.

Figure 4 is the arrangement shown in Figure 5 but in an open position.

Figure 5 is a section of the wall of a receptacle showing a bung and pouring spout in a closed position.

Figure 6 is the arrangement shown in Figure 7 with both the bung and spout in an open position.

Similar characters of references indicate corresponding parts and referring now to the same, the character 10 shows a receptacle wider at its lower end 11 and having a filler cap 12 at the top. This is merely a conventional type of paper milk bottle but my device will fit equally well to a square or rectangular shaped bottle as well as a bottle having a round filler cap and terminating into a hexagon or octagon structure. A pouring spout 13 attached by means of a staple 14 is adherently fastened to the outer surface of the wall of the receptacle 10 and is sealed around its edge by means of paraffine or the like.

In Figures 1 and 2 I illustrate a receptacle 10 having a port 15 pierced through the entire wall and covered by a bung 17 which is hingedly supported by the staple 18, the bung 17 having a recessed projecting member 19 which wedges against and fits snugly to the inner edge of the port 15.

The construction and contour of the pouring spout 13 obviously changes according to the design of the receptacle 10 or the bung 17 may be used in connection with the port 15 without employing a pouring spout if desired. When the cream above the level of the port 15 leaves the receptacle 10 the spout 13 will guide its path whether it be of concave construction or having upwardly projecting members 20 as shown in Figures 1 and 2.

In this manner the filler cap 12 need not be removed from the bottle in order to dispense the milk or the like in the receptacle 10 and the pouring spout 13 can be placed over the port 15 to keep any foreign matter from entering the inside of the receptacle.

In the chosen embodiments of my invention, exemplified by the accompanying drawings, there are present certain novel refinements and improvements not heretofore disclosed in the prior art, and which will be hereinafter more fully referred to and specifically pointed out in the appended claims.

Having thus described my invention what I claim and desire to secure by Letters Patent in the United States is:

1. A device of the character described in combination with a receptacle, said receptacle provided with a filler cap at its top, an aperture through the outer wall of said receptacle at a point lower than said filler cap, a pouring spout hingedly supported by the outer wall of said receptacle, a bung hingedly supported for engagement into said aperture, said pouring spout arranged to cover said bung, the outer edges of said pouring spout adapted to be sealed against the outer surface of the receptacle wall.

2. A device of the character described comprising in combination a receptacle, said receptacle provided with a filler cap at its top, an aperture through the outer wall of said receptacle, said aperture located at a point below said filler cap, a pouring spout, said pouring spout hingedly attached below said aperture to the outer wall of said receptacle, said pouring spout being scored in a manner to permit folding its outer edges upward, a bung hingedly supported above said aperture to the side of said receptacle, said bung having an inwardly projecting member for engagement into said aperture and means for adherently sealing the outer edges of said pouring spout to the outer surface of the receptacle wall around the entire outer edge of said bung.

ANTHONY J. BATZLER.

REFERENCES CITED

The following references are of record in the file of this patent:

UNITED STATES PATENTS

| Number | Name | Date |
|---|---|---|
| 1,026,828 | Pierce | May 21, 1912 |
| 1,726,090 | Von Briesen et al. | Aug. 27, 1929 |
| 2,077,341 | Martin et al. | Apr. 13, 1937 |
| 2,079,026 | Moir | May 4, 1937 |